United States Patent
Whitney et al.

(10) Patent No.: US 6,332,987 B1
(45) Date of Patent: *Dec. 25, 2001

(54) ELEMENTS AND METHODS FOR COALESCING A DISCONTINUOUS PHASE OF A FLUID FROM A CONTINUOUS PHASE

(75) Inventors: Scott A. Whitney, Marathon; Kenneth M. Williamson, Jamesville; Michael A. Clendenning, Cortland; James R. Hibbard, Whitney Point; Angela M. Griffin, Homer, all of NY (US)

(73) Assignee: Pall Corporation, East Hill, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,509

(22) PCT Filed: Sep. 30, 1997

(86) PCT No.: PCT/US97/17515

§ 371 Date: Jun. 18, 1999

§ 102(e) Date: Sep. 30, 1997

(87) PCT Pub. No.: WO98/14257

PCT Pub. Date: Apr. 9, 1998

Related U.S. Application Data

(60) Provisional application No. 60/027,129, filed on Sep. 30, 1996.

(51) Int. Cl.[7] .................................................. B01D 17/02
(52) U.S. Cl. .......................... 210/799; 210/315; 210/317; 210/484; 210/489; 210/497.01; 210/DIG. 5
(58) Field of Search .................................. 210/315, 317, 210/484, 489, 799, 485, 497.01, DIG. 5

(56) References Cited

U.S. PATENT DOCUMENTS

| | | | |
|---|---|---|---|
| 4,058,463 | * 11/1977 | Bartik | ................................... 210/317 |
| 4,209,310 | * 6/1980 | Berkhoel | .............................. 55/510 |
| 4,892,667 | 1/1990 | Parker, III et al. . | |
| 5,252,207 | * 10/1993 | Miller et al. | ...................... 210/493.1 |
| 5,543,047 | 8/1996 | Stoyell et al. . | |
| 6,071,419 | * 6/2000 | Beier et al. | ........................... 210/767 |

FOREIGN PATENT DOCUMENTS

| | | |
|---|---|---|
| 0187564 | 1/1989 | (EP) . |
| 1490270 | 10/1977 | (GB) . |

* cited by examiner

Primary Examiner—Matthew O. Savage
(74) Attorney, Agent, or Firm—Leydig, Voit & Mayer, Ltd.

(57) ABSTRACT

A coalescing element is provided which is capable of separating a continuous phase fluid from a discontinuous phase fluid. The coalescing element includes a wrap structure which facilitates the coalescing process by conglomerating smaller droplets of the discontinuous phase fluid into larger droplets which may be of a size that will prevent them from being re-entrained.

21 Claims, 2 Drawing Sheets

ELEMENTS AND METHODS FOR COALESCING A DISCONTINUOUS PHASE OF A FLUID FROM A CONTINUOUS PHASE

This application claims priority from provisional application, U.S. Ser. No. 60/027,129, filed Sep. 30, 1996, which is incorporated herein by reference in its entirety.

BACKGROUND OF THE INVENTION

1. Field of the Invention

The present invention relates to a coalescer element and, more particularly, to a coalescer element with enhanced coalescence.

2. Discussion of the Related Art

Coalescers, sometimes in conjunction with separators, including inertial separators, settling devices, and separator cartridges, are generally utilized in industrial processes to separate several phases present in fluids, i.e., gases and/or liquids. In some instances such fluids constitute dispersions of two or more immiscible liquids such as oil and water. In other instances, such fluids constitute suspensions of liquid and/or solid particles in gas. In addition to separation, coalescers generally draw together or conglomerate smaller portions of one of the phases present in the fluid.

The spectrum of applications where coalescers have been used to remove minor amounts of a first phase, known as a discontinuous phase, from a second phase in which it is suspended, known as the continuous phase, covers a considerable range of situations. For example, coalescers may be utilized to remove water from compressed gas streams such as air, helium, hydrogen, nitrogen, carbon dioxide, and natural gas.

Coalescers may also be utilized to remove contaminants found in natural bodies of water such as oil spills. Additionally, coalescers may be utilized to separate small amounts of moisture, i.e., water, from petroleum based fuels, including gasoline, diesel and aviation fuels, such as kerosene.

In a coalescing process, for example, the coalescence of water from a petroleum based fuel, the fuel containing the water is passed through a coalescer comprising a coalescing medium. The fuel, which is the continuous phase fluid, passes through the medium and flows toward a first outlet. As the water, which is the discontinuous phase fluid, passes through the medium it tends to collect on the surface of the coalescing medium and form small droplets which are forced through the medium by the continuous phase fluid. The coalescing medium may be formed from or coated with a material which facilitates the formation of the droplets and the conglomeration of these small droplets into larger droplets. The larger water droplets are more easily removed via a second outlet and are less likely to be re-entrained into the fuel.

A limiting factor in the effectiveness or efficiency of the coalescing process in the re-entrainment of the droplets of the discontinuous phase fluid into the continuous phase fluid after they emerge from the coalescing medium. Re-entrainment may occur because of a number of reasons. One reason re-entrainment may occur is because the droplets of the discontinuous phase are too small and may be easily carried along by the potentially high flow rates of the continuous phase fluid to the continuous phase outlet. Accordingly, the smaller the droplets, the more likely the chance of re-entrainment. In addition, the smaller the droplets, the more likely the chance of the droplets penetrating a separator cartridge or any other type of separator, if a separator is utilized. Similarly, the larger the droplets, the less likely the chance of re-entrainment because they are less likely to be carried by the continuous phase fluid to the continuous phase fluid outlet and the less likely to penetrate into a separator.

Various mechanisms have been tried to increase the size of the droplets of the discontinuous phase fluid. For example, socks, foam, nettings, fuzzy woven or non-woven materials, or combinations thereof positioned over the coalescing medium have been utilized to increase the size of the droplets. However, in high surfactant conditions, the above-referenced materials or combination of materials which may be utilized, increase the size of the coalescing elements.

SUMMARY OF THE INVENTION

The coalescer element embodying the present invention overcomes many of the limitations of the prior art by preventing or substantially minimizing re-entrainment of the discontinuous phase fluid into the continuous phase fluid.

In accordance with one aspect, the present invention is directed to a coalescer element for separating a discontinuous phase from a continuous phase of a fluid. The coalescer element comprises a coalescer medium having a downstream surface and a porous wrap structure cooperatively associated with the coalescing medium and including pores and a multiplicity of holes. The pores allow the passage of the continuous phase but resist the passage of the discontinuous phase. The holes, which are substantially larger than the pores, allow the passage of both the continuous and the discontinuous phase and are arranged to resist re-entrainment of droplets of the discontinuous phase into the continuous phase portion of the fluid.

In accordance with another aspect, the present invention is directed to a method of coalescing a discontinuous phase from a continuous phase of a fluid. The method comprises directing a fluid through a coalescing medium droplets of the discontinuous phase portion being formed in the coalescing medium and the continuous phase passing through the coalescing medium. The method further comprises directing the continuous phase through pores in a porous wrap structure and through a multiplicity of holes formed in the porous wrap structure which are substantially larger than the pores and directing the discontinuous phase through the multiplicity of holes to resist re-entrainment of the droplets of the discontinuous phase into the continuous phase portion of the fluid.

The coalescer element of the present invention may be utilized in a wide variety of coalescing applications and may comprise various configurations. However, for any given application and any given configuration, the coalescer element is designed to enhance the efficiency of the coalescing process by substantially preventing the re-entrainment of the discontinuous phase fluid into the continuous phase fluid. Re-entrainment is substantially prevented by facilitating the formation of discontinuous phase droplets of a substantially uniform size that are large enough not to become re-entrained by the flow of the continuous phase fluid even in the presence of high flow rates. The coalescer element of the present invention utilizes a wrap structure to form the larger droplets.

The coalescer element of the present invention is designed to increase the efficiency of the coalescing process without having to increase the size of the coalescing medium, thereby allowing for less expensive and smaller or more compact coalescing systems. In addition, the coalescer element of the present invention may be utilized in exiting systems with only minor modifications, if any. Accordingly, the coalescer element provides an inexpensive and simple mechanism for enhancing the efficiency of all coalescing processes regardless of whether the coalescing process involves dispersions of two or more immiscible liquids, such as petroleum based fuels and water, or aerosols.

DETAILED DESCRIPTION OF THE PREFERRED EMBODIMENTS

Coalescer elements are structures which comprise a coalescing medium, having upstream and downstream surfaces, for separating one or more phases in a fluid, i.e., separating a minor amount of a first phase, known as the discontinuous phase, from a second phase in which it is suspended, known as the continuous phase. In a coalescing process, a fluid is passed through the coalescing medium of the coalescer element which is positioned within a housing. The continuous phase of the fluid passes through the medium and is directed to a first outlet in the housing while the discontinuous phase tends to collect on the downstream surface of the coalescing medium as small droplets. The coalescing medium may be formed from or coated with a material which facilitates the formation of and conglomeration of the small droplets into larger droplets which may be easily removed via a second outlet in the housing.

Figure 1:
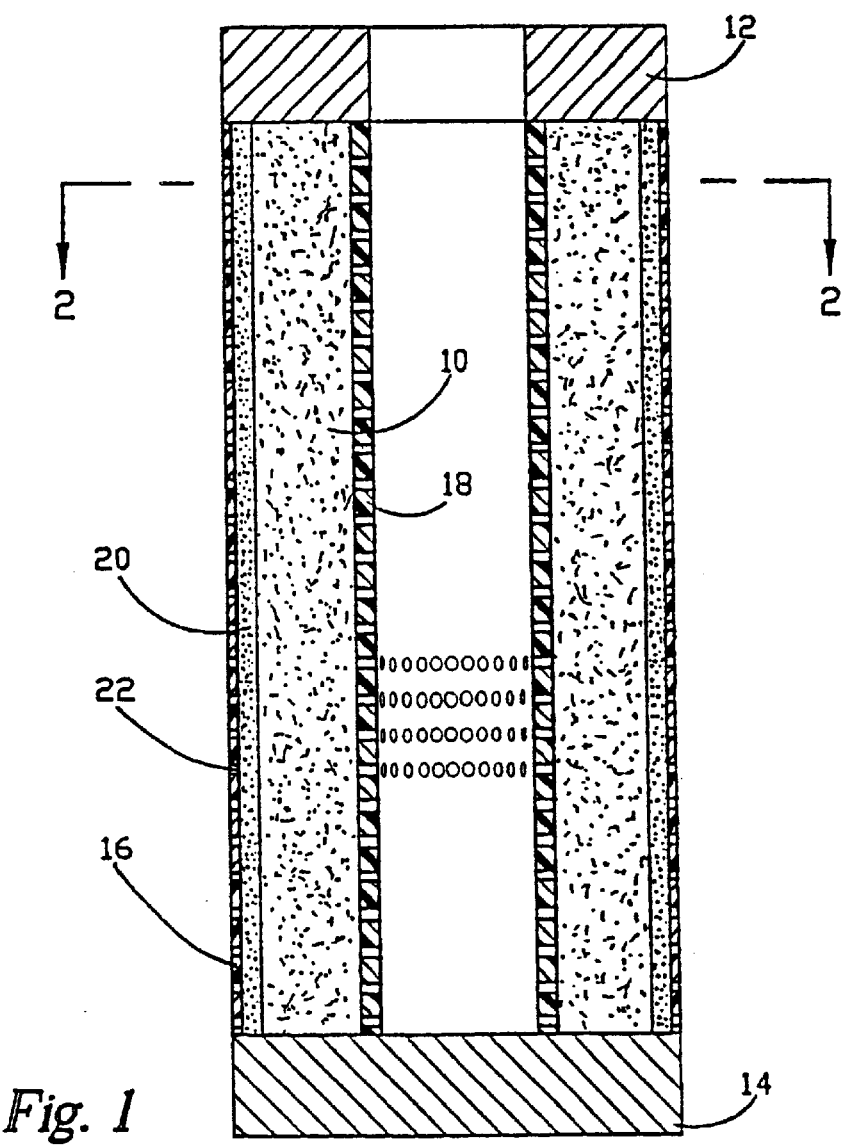
FIG. 1 is a diagrammatic sectional representation of a coalescer element in accordance with the present invention.
Figure 2:
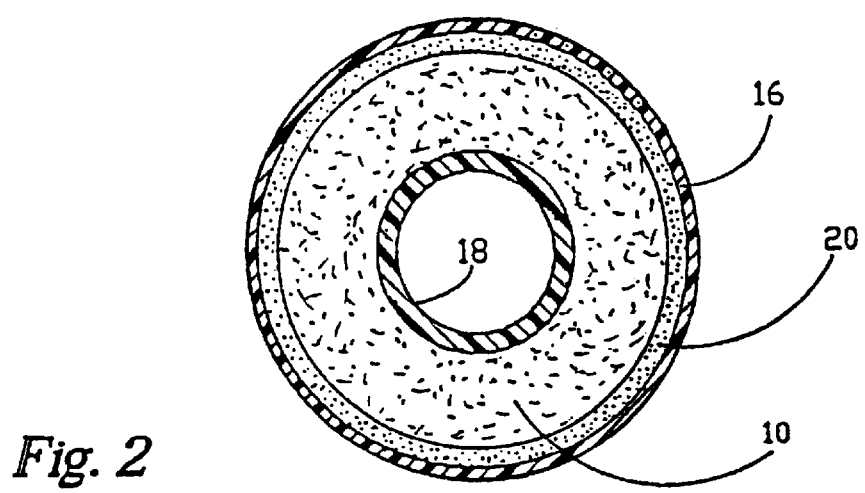
FIG. 2 is a top sectional view of the coalescer element of FIG. 1 taken along section line 2—2.

Although a number of different designs and configurations exist for coalescer elements, cylindrically shaped coalescer elements are most frequently employed. This probably results from the fact that this design enhances the efficiency for a given volume or size of a housing. FIGS. 1 and 2 illustrates an exemplary cylindrical coalescer element in accordance with the present invention. The coalescer element 100 comprises a coalescing medium 10 having an upstream surface and a downstream surface, first and second end caps 12 and 14 attached at opposite ends of the coalescing medium 10, at least one of which includes an opening through which the fluid to undergo coalescence may flow, and a wrap structure 16. The coalescer element 100 may also comprise an inner support structure such as a support core 18, and a final classifier 20. The support core 18 may be positioned coaxially within the coalescing medium 10 adjacent to or in contact with the inner surface of the coalescing medium 10. The final classifier 20 may be positioned around the coalescing medium such that it is in contact with the downstream surface of the coalescing medium 10. The wrap structure 16 may be positioned around the downstream surface of the final classifier 20 or if no final classifier 20 is utilized, directly around the downstream surface of the coalescing medium 10.

The coalescing medium 10 may include any type of medium suitable for the application in which the coalescer element 100 is employed. The coalescing medium may use fibrous materials, such as a fibrous mass, fibrous mats, woven or non woven fibrous sheets, or porous membranes, such as supported or n microporous membranes. The coalescing medium 10 may have a uniform or graded pore structure and any appropriately effective pore size. The coalescing medium 10, in addition to being porous, may be configured in a non-pleated or pleated arrangement, and when pleated, the pleats may be straight, radially extending from the axis of the cylindrical element 100, or they may be arranged in a laid-over configuration as disclosed in U.S. Pat. No. 5,543,047. In the exemplary embodiment, the coalescing medium 10 preferably comprises glass fibers, polymeric fibers such as polyesters, or other surface modified materials.

In the exemplary embodiment, the first end cap 12 is an open end cap and the second end cap 14 is a blind end cap. Accordingly, fluid to be coalesced may enter through an opening in the first end cap 12 and is constrained to flow inside-out through the coalescing medium 10 by the blind end cap 14. The first and second end caps 12,14 may comprise any suitable impervious metals, ceramics, elastomers, or polymeric materials. In addition, the first and second end caps may be attached to the ends of the coalescing medium 10 in any suitable manner. For example, the end caps 12,14 may be thermally bonded, spin welded, sonically welded, polycapped, or bonded by means of an adhesive or a solvent to the ends of the coalescing medium 10.

In the exemplary embodiment illustrated in FIGS. 1 and 2, the coalescer element 100 also comprises a support core 18 which provides structural support for the coalescing medium 10. The upstream or inner surface of the coalescing medium 10 lies adjacent to or contacts the coaxially positioned support core 18. The support core 18 may be permanently attached to the end caps 12,14 by any suitable means or simply positioned between the end caps 12,14. The support core 18 may be formed from very open pores or perforated materials which are chemically compatible with the fluid undergoing coalescence and which preferably do not substantially change the pressure differential through the coalescer element 100.

In addition, the coalescer element 100 also may comprise a final classifier 20. The final classifier 20 may also comprise a separate structure or be part of an outer support structure such as a cage. In the exemplary embodiment, the final classifier 20 comprises a separate structure positioned around the coalescing medium 10 such that the downstream or outer surface of the coalescing medium 10 is in intimate contact with the upstream or inner surface of the final classifier 20. The final classifier 20 functions as a porous drainage layer which assists the coalescing medium 10 to accumulate the droplets of the discontinuous phase fluid and conglomerates them into larger droplets. To improve drainage and the accumulation of the droplets of the discontinuous phase, the final classifier 20 may be coated with or formed from a material which facilitates coalescence by allowing droplets to form and to conglomerate into larger droplets. For example, the final classifier 20 may be formed from any material which facilitates the separation of the discontinuous phase fluid from the continuous phase fluid, conglomerates the smaller droplets formed in the coalescing medium 10 into larger droplets and which is chemically inert to each of the components present in the phases being separated. In applications where the discontinuous phase fluid is an aqueous fluid and the continuous phase fluid is a petroleum or hydrocarbon based fluid, the final classifier 20 preferably comprises a material or is coated with a material which is not wetted by the discontinuous phase. For example, the final classifier 20 may have a critical surface energy below the surface tension of the discontinuous phase fluid. In applications in which water is the discontinuous phase, materials which may be utilized include silicones and fluoropolymeric materials. Alternatively, in applications where the discontinuous phase fluid is a petroleum or hydrocarbon based fluid and the continuous phase fluid is an aqueous fluid, the final classifier 20 preferably comprises a hydrophobic or hydrophilic material or is coated with a hydrophobic or hydrophilic material, such as glass fibers, nylon, cotton, and treated polymers.

The wrap structure 16 may be positioned around the downstream surface of the coalescing medium 10 or the final classifier 20, if a final classifier is utilized. In the exemplary embodiment illustrated in FIGS. 1 and 2, the wrap structure 16 is preferably positioned around the downstream surface of the final classifier 20. As stated above, the final classifier 20 facilitates coalescence by forming larger droplets of the discontinuous phase fluid from the smaller droplets on the downstream surface of the coalescing medium 10. The wrap structure 16 functions to conglomerate the larger droplets formed by the final classifier 20 into even larger droplets so as to prevent re-entrainment of the droplets into the continuous phase fluid as is explained in detail below.

As higher flow rates, smaller housings, and correspondingly higher fluid flow velocities are developed in coalescing applications, the efficiency of the coalescing process may be reduced by re-entrainment of the droplets of the discontinuous phase fluid into the continuous phase fluid. Essentially, higher radial flow velocities of the continuous phase though the coalescing medium 10 tend to shear smaller droplets of the discontinuous phase fluid from the coalescing medium 10. If the droplets of the discontinuous phase fluid are larger, there is less likely of a chance that the droplets of the discontinuous phase fluid would be prematurely sheared from the coalescing medium 10 and re-entrained in the continuous phase. The wrap structure 16, as explained above, facilitates the formation of larger droplets from the droplets on the downstream surface of the final classifier 20. Accordingly, for a given flow rate and velocity, higher coalescence efficiency may be achieved without having to increase the thickness or structure of the coalescing medium, which is what is normally one of the ways in which to increase coalescence efficiency. Since efficiency may be increased without an increase in the thickness of the coalescing medium 10, housings for the coalescer elements may be maintained at their current sizes or even made smaller since it may be possible to decrease the size of the coalescing medium 10 by the use of the wrap structure 16. In addition, by utilizing the wrap structure 16, higher flow rates and velocities may be achieved without a loss in coalescence efficiency.

Various embodiments of the wrap structure 16 may be utilized in the present invention. For example, the wrap structure 16 may comprise a flexible material that may be wrapped radially or helically around the final classifier 20 or it may comprise a less flexible cylindrical sleeve-type structure. Regardless of the specific embodiment, the wrap structure 16 may uniformly compress the final classifier 20 and coalescing medium 10 to reduce the voids volume. In reducing the voids volume, hold-up volume may be decreased. In addition, since the wrap structure 16 is preferably tightly fitted around the final classifier 20, it may compress the final classifier 20 and the coalescing medium 10, and the overall required diameter of the coalescer element 100 may be reduced. Thus smaller housings may be utilized resulting in significant cost savings. However, the amount of compression of the coalescing medium 10 may effect the coalescing process. For example, increasing the compression of the coalescing medium 10 and the final classifier 20 with the unique wrap structure 16 of the present invention results in larger and more uniformly sized discontinuous phase droplets. If, however, the coalescing medium 10 and the final classifier 20 are compressed too much, the voids volume may be reduced such that smaller droplets of the discontinuous phase may occur. The amount of compression may vary with the particular fluids undergoing coalescence.

Figure 3:
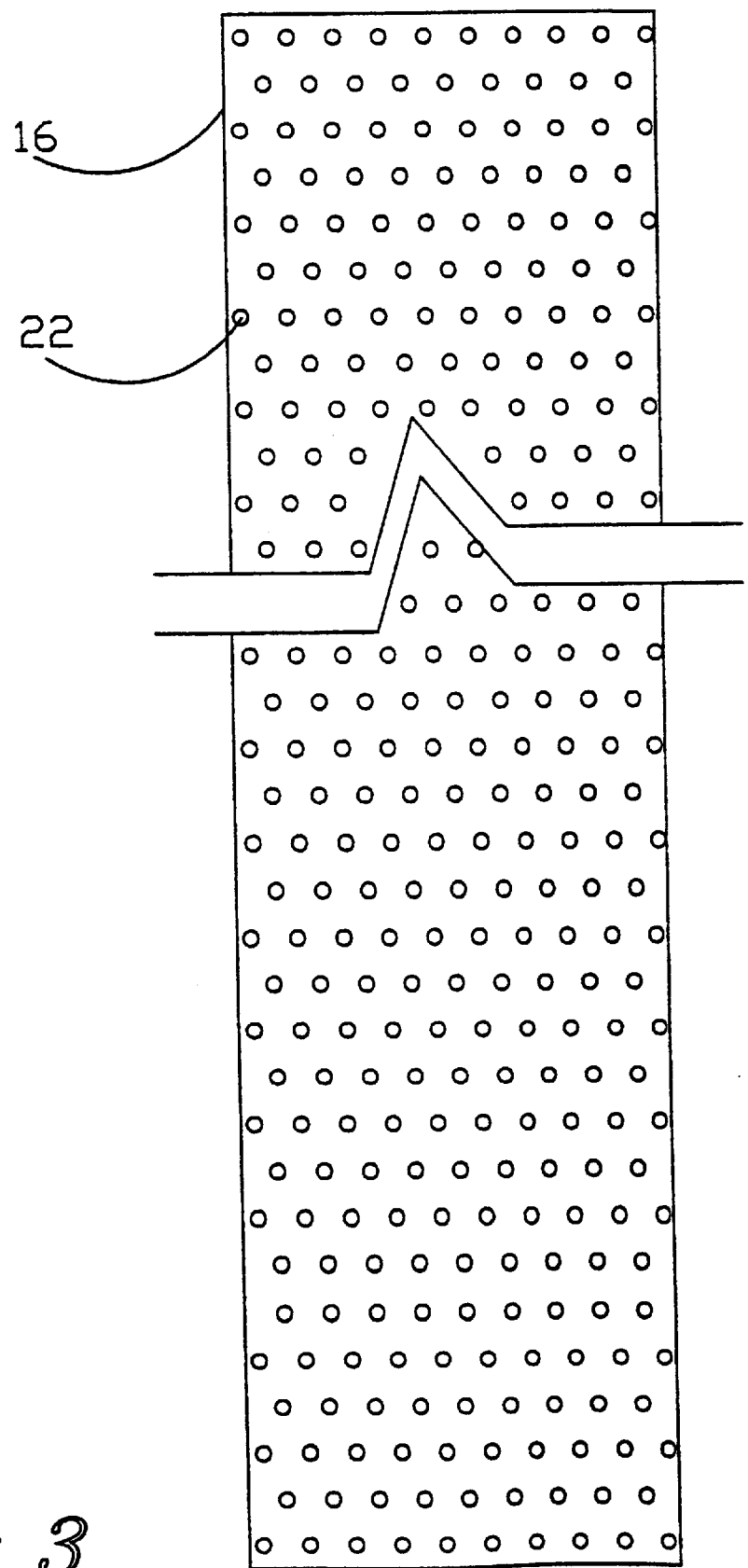
FIG. 3 is a diagrammatic representation of a wrap structure of the coalescer element of the present invention.

FIG. 3 illustrates an exemplary embodiment of the wrap structure 16 of the present invention. In the exemplary embodiment, the wrap structure 16 comprises a substantially cylindrical sleeve having an inside diameter less than the outer diameter of the final classifier 20 such that when the wrap structure 16 is positioned around the final classifier 20, the final classifier 20 and the coalescing medium 10 are compressed as described above. The length of the wrap structure 16 may be any length such that it fits within the end caps 12,14. For example, the wrap structure 16 may be equal in length to the coalescing medium 20 or less than the coalescing medium 10, e.g., half or more of the axial length. In the exemplary embodiment the wrap structure 16 is substantially equal in length to the coalescing medium 10 and may be attached to the end caps 12,14. The wrap structure 16 preferably comprises a porous material. The wrap structure 16 also comprises a multiplicity of holes 22 arranged around the wrap structure 16. The holes 22 may be randomly arranged around the wrap structure 16 or, more preferably, the holes 22 may be uniformly arranged in both the radial and axial direction. Uniformly arranged holes 22 are preferable over randomly arranged holes because a more uniformly sized discontinuous phase droplet results from uniformly distributed and equally sized holes 22. The holes 22 may be any shape and size, for example, square or rectangular, but are preferably circular and substantially equal in size.

The size of the holes 22 and the spacing between the holes 22 may vary with the particular coalescing application. For example, the holes 22 may be as small as about 20 thousandths of an inch in diameter and spaced about 40 thousandths of an inch on center. In the exemplary embodiment, the holes 22 are preferably about ⅛ inch in diameter and are preferably spaced apart about ¼ inch on center. However, the holes 22 may be as large as about ¼ inch in diameter or more and spaced apart about ½ inch on center or more. The holes 22 in the wrap structure 16 function to conglomerate the larger droplets of the discontinuous phase fluid on the downstream surface of the final classifier 20 by forcing the droplets through the uniformly distributed holes 22. The wrap structure 16 preferably comprises a porous material which may repel the discontinuous phase but allow the continuous phase to pass through its pores. For example, the wrap structure 16 may be liquophobic with respect to the discontinuous phase but liquophilic with respect to the continuous phase. If the discontinuous phase is water and the continuous phase fluid is a petroleum based fuel, then the wrap structure 16 may be formed from or comprise a hydrophobic material which is liquophilic with respect to the continuous phase. Alternatively, the wrap structure 16 may be coated with such a material rather than being formed from the material. Accordingly, the droplets of the discontinuous phase are constrained to primarily flow through the holes 22 while the continuous phase may pass through the pores of the material of the wrap structure 16 as well as through the holes 22. Since the droplets of the discontinuous phase primarily flow through the holes 22, the droplets on the downstream surface of the final classifier 20 are forced together to flow through the holes 22 in the wrap structure 16, thereby forming larger droplets of discontinuous phase fluid.

The wrap structure 16 may comprise any suitable porous material that is compatible with the particular fluids undergoing coalescence. In addition, the wrap structure 16 preferably comprises a material which substantially prevents or hinders the transport of the discontinuous phase fluid through the pores of the wrap structure 16 and while allowing the transport of the continuous phase. In other words, the wrap structure 16 preferably comprises a material that is a barrier to the discontinuous phase, but not the continuous phase. In the exemplary embodiment, the wrap structure 16 comprises a non-woven sheet of fibrous material, such as a polyester material available under the trade designation Reemay, and formed into a cylindrical shell or sleeve as illustrated in FIG. 2. The thickness of the wrap structure 16 depends upon a number of factors, including the type of material utilized. For example, a certain robustness may be preferred such that the holes 22 remain uniformly distributed and in the proper position. Additionally, the wrap structure 16 preferably compresses the final classifier 16 and the coalescing medium 10 and thus is in intimate contact therewith. Accordingly, the material and the thickness of the wrap structure 16 preferably stands up to the dynamic fluid forces generated during coalescence. In the exemplary embodiment, the wrap structure may be in the range from about 5 thousandths of an inch to about 30 thousandths of an inch thick.

The wrap structure 16 may be positioned over the final classifier 20 by simply sliding it over the final classifier 20 or by utilizing a tapered tool which compresses the final classifier 20 and the coalescing medium 10 to a diameter less than the inner diameter of the wrap structure 16 and allows the wrap structure 16 to slide along the tapered section of the tool prior to the end caps 12,14 being attached to the medium 10. The wrap structure 16 may be held in place by frictional engagement and a seal may be provided between the end caps 12,14 and the wrap structure 16 to prevent fluid by-pass. Alternatively, the wrap structure 16 may preferably be permanently secured to the end caps 12,14. The wrap structure 16 may be permanently attached to the end caps 12 and 14 by any suitable means such as various bonding and welding techniques. If the wrap structure 16 is permanently attached to the end caps 12,14, no seal may be necessary. Alternatively, the wrap structure 16 may be helically or radially wrapped around the final classifier 20.

The wrap structure 16 may be manufactured in a wide variety of ways. For example, the material forming the sleeve may be perforated prior to being formed into a cylindrical shape or after being formed into a cylindrical shape. Additionally, the holes 22 may be formed in a variety of ways. However, it is preferable that the holes 22 have edges which are substantially free of imperfections, such as frays, that may tend to hinder the flow of the droplets of the discontinuous phase. In the exemplary embodiment, the polyester material is placed between two substantially flat plates. Each plate has a multiplicity of holes corresponding to a desired hole arrangement for the wrap structure, for example, the hole arrangement on the wrap structure 16 illustrated in FIG. 3. Once the polyester material is placed between the plates, which preferably are formed from a material having a melting point substantially higher than the polyester material, e.g., metallic materials and the holes in each plate are aligned, a torch or other device is utilized to melt the material in the region of the holes in the metallic plates such that holes are formed in the polyester material. Using this technique generally results in uniformly sized holes 22 which have substantially smooth edges. Once the holes 22 are formed, the polyester material is cut to size and rolled into a cylindrical shape and a side seam is formed using any suitable technique such as welding or bonding.

In operation, a fluid which is to undergo coalescence, for example, an immiscible mixture of aviation fuel and water, is directed to the coalescer element 100. The fluid enters the first or open end cap 12 and flows into a central region of the coalescer element 100. A filter may be placed in the fluid flow path to remove various solid contaminants from the immiscible mixture. For example, a filter may be placed within the coalescer element 100. The second or blind end cap 14 constrains the fluid to flow through the support core 18, which is perforated and offers substantially no interference with the flow of fluid, and through the coalescing medium 10, the final classifier 20 and the wrap structure 16. The coalescing medium 10, as described above, allows the continuous phase fluid, e.g., aviation fuel, to pass through while the discontinuous phase, water, tends to form droplets in the coalescing medium 10. The final classifier 20 also allows the continuous phase fluid to pass through while facilitating further conglomeration of the droplets into larger droplets in the final classifier 20. Finally, the wrap structure 16 allows the continuous phase fluid to pass therethrough while constraining the discontinuous phase fluid to pass through the holes 22 in the wrap structure 16 to form larger droplets of the discontinuous phase fluid. These larger droplets are preferably large enough not to be re-entrained in the flow of the continuous phase fluid regardless of how high the radial flow rate through the coalescer element 100 or how high the axial flow along the coalescer element 100.

Although the above description is for a coalescer element designed for inside to outside flow, i.e., the fluid which is to undergo coalescence enters into an inner region of the coalescing medium and flows outward, a coalescer element in accordance with the present invention may be designed for outside to inside flow. For example, the coalescer element may comprise a final classifier and wrap structure that may be positioned on the inside of or in the inner region of a cylindrically shaped coalescing medium. The coalescer element may then comprise a coalescing medium, two end caps attached to the ends of the coalescing medium, a final classifier coaxially arranged within the coalescing medium, and a wrap structure positioned within the final classifier. An inner and outer support structure, however, may also be utilized. The principle of operation is the same as described above.

Although shown and described are what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A coalescer element for separating a discontinuous phase from a continuous phase of a fluid which can be directed through the coalescer element, the coalescer element comprising:

a coalescing medium having a downstream surface;

a porous wrap structure cooperatively associated with the coalescing medium and disposed downstream of the downstream surface of the coalescing medium, the wrap structure including pores and a multiplicity of holes wherein the pores allow passage of the continuous phase but resist passage of the discontinuous phase, and the holes allow passage of both the continuous phase and discontinuous phase, the holes being substantially larger than the pores; and a final classifier interposed between the coalescing medium and the porous wrap structure.

2. The coalescer element according to claim 1 wherein the wrap structure comprises polyester.

3. The coalescer element according to claim 1 wherein the multiplicity of holes are uniformly distributed.

4. The coalescer element according to claim 1, wherein the wrap structure compresses the coalescing medium and the final classifier.

5. The coalescer element according to claim 1, wherein the wrap structure comprises a cylindrical sleeve.

6. The coalescer element according to claim 1, wherein the multiplicity of holes have a dimension of about 1/8 inch.

7. The coalescer element according to claim 6, wherein the multiplicity of holes are spaced apart about 1/4 inch on center.

8. The coalescer element according to claim 1 further comprising first and second end caps fixed at opposite ends of the coalescing medium, wherein the wrap structure is attached to the first and second end caps.

9. The coalescer element according to claim 1, wherein the porous structure is hydrophobic and is substantially wettable by hydrocarbons.

10. The coalescer element according to claim 9 wherein the porous wrap structure is substantially wettable by petroleum.

11. The coalescer element according to claim 1 wherein the holes are arranged to resist re-entrainment of droplets of the discontinuous phase in the continuous phase portion of the fluid.

12. The coalescer clement according to claim 1 wherein each hole has a substantially smooth edge.

13. The coalescer element according to claim 1 further comprising first and second end caps fixed at opposite ends of the coalescing medium and wherein the wrap structure comprises a cylindrical sleeve attached to the first and second end caps.

14. The coalescer element according to claim 13 wherein each hole has a substantially smooth edge and a dimension of about 1/8 inch and the multiplicity of holes are spaced apart about 1/4 inch on center.

15. The coalescer element according to claim 1 wherein the multiplicity of holes have a dimension of about 1/8 inch and are uniformly distributed in the wrap structure and are spaced apart about 1/4 inch on center.

16. The coalescing element according to claim 15 wherein each hole has a substantially smooth edge and the wrap structure comprises a cylindrical sleeve, the coalescing element further comprising first and second end caps fixed at opposite ends of the coalescing medium, wherein the wrap structure is attached to the first and second end caps.

17. The coalescer element according to claim 1 wherein the holes have a dimension as small as 0.02 inches.

18. A method of coalescing a discontinuous phase from a continuous phase of a fluid, the method comprising:

directing a fluid through a coalescing medium, the coalescing medium forming droplets of a discontinuous phase portion of a fluid thereof and passing a continuous phase of the fluid therethrough; and directing the continuous phase through pores in a porous wrap structure and through a multiplicity of holes substantial larger than the pores formed in the porous wrap structure; and directing the discontinuous phase through the multiplicity of holes to resist re-entrainment of droplets of the discontinuous phase into the continuous phase portion of the fluid.

19. The method of coalescing according to claim 18 further comprising after directing the fluid through the coalescing medium and prior to directing the discontinuous phase through the multiplicity of holes, directing the fluid through a final classifier, the final classifier forming even larger droplets of the discontinuous phase portion of the fluid and passing the continuous phase of the fluid therethrough.

20. The method of coalescing according to claim 18 wherein directing a fluid through a coalescing medium comprises directing a discontinuous phase comprising an aqueous liquid and a continuous phase comprising a hydrocarbon.

21. The method of coalescing according to claim 20 wherein directing a discontinuous phase comprises directing water and directing a continuous phase comprises directing petroleum.

* * * * *